No. 863,317. PATENTED AUG. 13, 1907.
J. H. RICHARDS.
TRANSMISSION GEAR.
APPLICATION FILED MAR. 21, 1907.
3 SHEETS—SHEET 1.
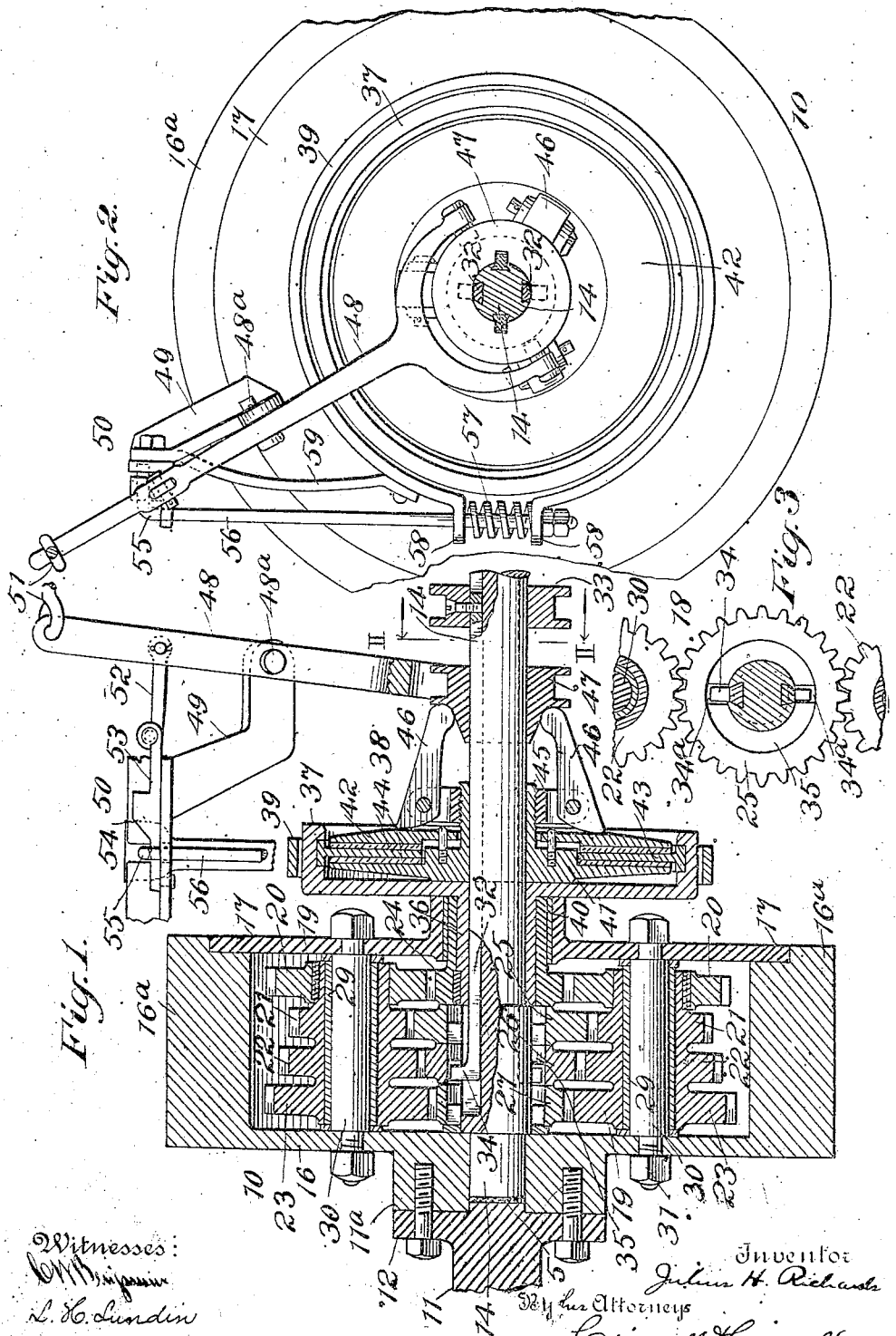

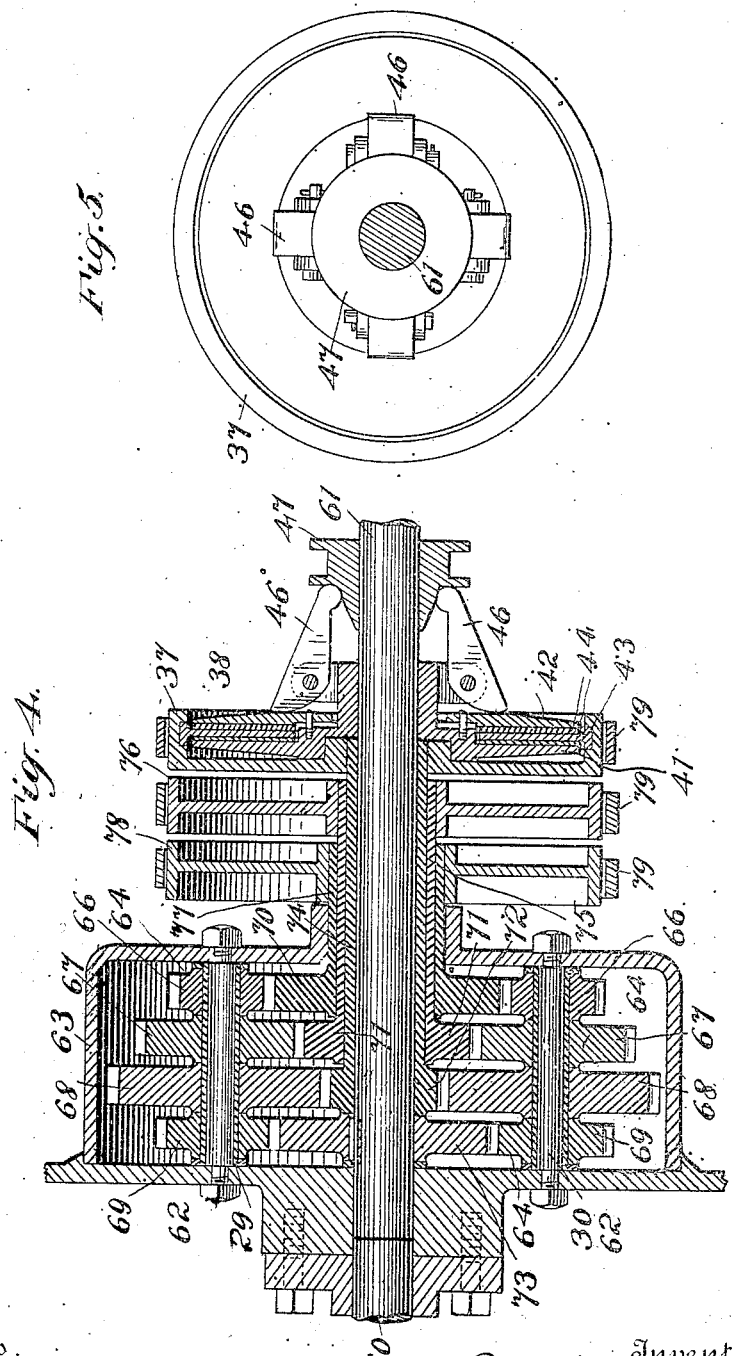

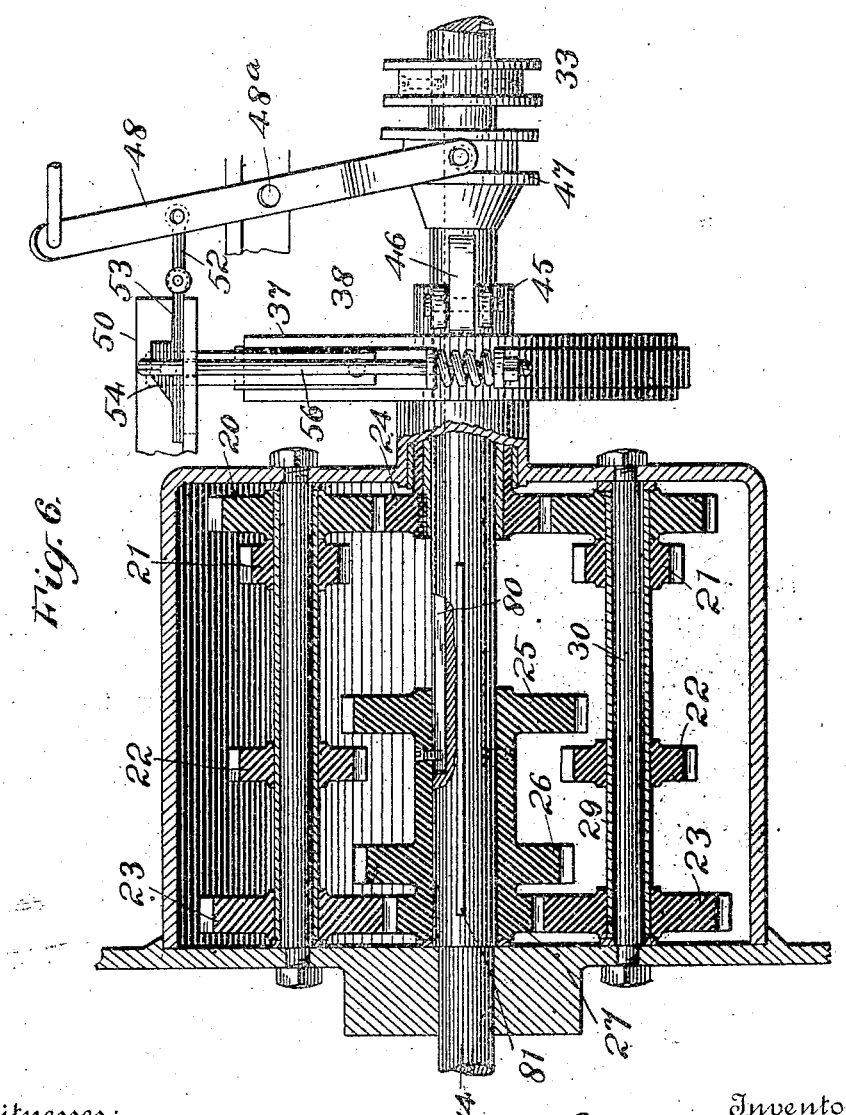

UNITED STATES PATENT OFFICE.

JULIUS HENRY RICHARDS, OF TORRINGTON, CONNECTICUT.

TRANSMISSION-GEAR.

No. 863,317.

Specification of Letters Patent.

Patented Aug. 13, 1907.

Application filed March 21, 1907. Serial No. 363,704.

*To all whom it may concern:*

Be it known that I, JULIUS HENRY RICHARDS, a citizen of the United States, and a resident of Torrington, county of Litchfield, and State of Connecticut, have invented certain new and useful Improvements in Transmission Mechanism, of which the following is a full, clear, and exact description.

This invention relates more particularly to speed changing and power transmission devices for automobiles.

The primary object of the invention is to provide a transmission mechanism for automobiles which is adapted to have a part thereof run at the same speed as the engine; which may be inclosed and carried in part by the engine fly-wheel; which is simple in operation and inexpensive to manufacture; and which has the highest speed always at the driver's command and which may be obtained immediately regardless of the speed at which the car is running and without disconnecting the usual fly-wheel clutch or performing any other separate and independent operation.

Another object of the invention is to provide simple and efficient transmission means in which it is impossible to throw into mesh two gears at the same time, and in which none of the gears revolve on their own bearings or axis when the parts are thrown in a position for high speed.

A further object of the invention is to so arrange the transmission gears that the power will be applied away from the transmission shaft so as to obtain a leverage or purchase in the driving thereof.

With these and other objects in view, the invention will be hereinafter more particularly described with reference to the accompanying drawings, which form a part of this specification, and will then be pointed out in the claims at the end of the description.

In the drawings, Figure 1 is a vertical section, partly in elevation, of one form of device embodying my invention. Fig. 2 is a section on the line II—II of Fig. 1 through the transmission shaft, showing one means for operating the high speed clutch. Fig. 3 is a vertical section, partly broken away, taken through the transmission shaft and showing the means for locking some of the gears to the shaft. Fig. 4 is a vertical section, partly in elevation, showing a slightly different arrangement of the transmission gears, and means for changing the speed. Fig. 5 is a vertical section through the transmission shaft showing the clutch mechanism in elevation; and Fig. 6 is a vertical section, partly in elevation, of a slightly different form and arrangement of the parts for changing the speed.

The fly-wheel 10 may be attached to the engine shaft 11 in the usual way and may be of any desired form. As shown the fly-wheel is provided with a boss $11^a$, and to this boss is secured by bolts or otherwise a flange or collar 12 which is formed on or secured to the engine shaft 11. The shaft 11 may be operated in the usual manner, and said engine shaft may project slightly beyond the collar 12 so as to enter the recess in the boss $11^a$ of the fly-wheel to center and aline the same. In alinement with the engine shaft is a transmission shaft 14 between which and the engine shaft 11 is arranged a fibrous or other washer 15, one end of the transmission shaft 14 being held to rotate in the fly-wheel boss $11^a$. The fly-wheel 10 has a web portion 16 from which the rim $16^a$ projects, and fitting the rim $16^a$ is a head or cap portion 17, which with the fly-wheel forms a casing for the transmission gears 18. The fly-wheel thus serves as a casing to entirely inclose the transmission gears, and said gears, or a part thereof, may be so arranged that they will serve as a balance and compensate for some of the weight of the fly-wheel proper, but it is to be understood that the transmission mechanism need not necessarily be connected with the engine or fly-wheel shaft or formed as a part of the fly-wheel or a continuation of the engine shaft, but may be located at any suitable point, and operated from the engine shaft in any desired manner.

The transmission gears 18, Fig. 3 have one set thereof arranged with the transmission shaft 14 as its axis, and two sets 19 arranged on opposite sides of the shaft 14, though instead of two sets of gears 19 there may be any suitable number. The sets of gears 19 are so arranged that they will serve to balance the fly-wheel in its rotary movement, and each set comprises a plurality of gears of different diameters. As shown there are four gears 20, 21, 22, and 23 in each set 19, and these gears are adapted to mesh with the gears 24, 25, 26 and 27 respectively, which latter rotate with the transmission shaft 14 as an axis. The gears of each set of planetary or revoluble gears 19 are rigidly held together, and gears 21, 22, and 23 may be integral and the gear 20 may be keyed or otherwise secured to the other gears so that they will always rotate in unison. These sets of gears are each provided with a bushing 29, and are held to rotate on a stud 30 which extends between the web 16 of the fly-wheel and the cap 17, and by means of the nuts 31 on opposite ends of the studs or bolts 30 of both sets of gears 19, will not only hold the cap piece 17 to the fly-wheel rim, but will also secure the stud and hold the gears properly within the fly-wheel. The gear 20 of each set 19 is the same size as the gear 24 with which it is in mesh and these may be termed the driving gears, while gears 21 and 25 indicate the gears for intermediate speed, the gears 22 and 26 the slow speed, and the gears 23 and 27 secure the reverse action of the transmission shaft 14. The gears 25, 26 and 27 are loosely held on the shaft 14, and may rotate independent thereof, and held to slide in the shaft 14 are two keys 32. These keys 32 are held in slots in the shaft 14, and at one end are connected to a sleeve 33 which is adapted to be shifted lengthwise on the shaft 14 by a suitable lever, not shown, so as to force said keys therewith. The keys 32 have their inner ends 34 projecting outward beyond the periphery of the shaft 14 and are adapted to enter slots 34ª in either of the gears 25, 26 or 27 to lock the said gears to the shaft 14, and cause said shaft to rotate with either of the gears according to the position of the ends 34 of the keys. The gears 25 and 26 have an annular channel or groove 35 forming a neutral point or position for the keys and which extends substantially one-half the thickness of the gears to adapt the gears 25 and 26 to rotate independent of the shaft 14 when the keys are in alinement with these grooves or neutral points 35. As will be seen, if the gear 24 is held stationary, as will be presently described, and the fly-wheel rotated, the rotary movement of the fly-wheel will cause the revoluble or planetary sets of gears 19 to be carried thereby, and during this movement the said gears will be rotated on their own axis. This independent rotation of the sets of gears will also rotate the gears 25, 26, 27, and the speed of the shaft 14 and its direction of rotation will depend upon the position of the keys 32 and which of the latter gears said keys lock to the shaft 14. The position of the keys are such that they will lock the gear 26 to the shaft 14, and this locking of the gear to the shaft will cause said gear and shaft to rotate in unison but at the lowest speed. If the keys are shifted so as to lock the gear 25 to the shaft the next highest speed will be obtained by reason of the relative sizes of the gears, and a movement of the keys so as to lock the gear 27 to the shaft, owing to the gain by reason of the size of the gear 23 over the size of the gear 27, for example, one tooth, will cause the gear 27 and the transmission shaft 14 to rotate in a reverse direction from that of the engine shaft and the gears 25 and 26, the relative number of teeth and the gears and their arrangement with respect to each other being varied as desired. By arranging the sets of gears 19 as shown, the power is applied to the transmission shaft 14 from a distance so as to cause the sets of gears 19 to act as levers to drive the transmission shaft, and the gears may be made to compensate for a part of the weight of the fly-wheel and to balance the same during its rotary movement.

For the purpose of driving the transmission shaft 14 at different speeds, or in a reverse direction through the sets of gears 19, and the gears 25, 26, and 27, I extend the hub of the gear wheel 24 outward beyond the fly-wheel casing and securely fasten the gear hub to a sleeve 36, which is formed as a part of the clutch member 37. This clutch member 37 forms a part of a suitable clutch 38, and the said member is held to rotate loosely on the transmission shaft 14, and is adapted to be held stationary by means of a brake-band 39 when applied to the periphery thereof. The member 37 of the clutch and the hub of the gear are held to rotate in a boss or hub of the fly-wheel casing, and between the hub and the fly-wheel casing is a suitable bushing 40. As will be seen, when the brake-band 39 is applied to the periphery of the brake or clutch member 37, the latter and the gear 24 will be held stationary, and during the rotation of the fly-wheel around the gear 24 the latter will impart movement to the gears 20 of the sets 19, and through said gears will rotate the remaining gears 21, 22, and 23 of the sets 19 on their own axis. This independent rotary movement of the sets of gears 19 as they are carried around the shaft 14 will cause the transmission shaft to rotate in a reverse direction or forward at different speeds according to the position of the keys 32 as already explained. It is necessary in changing the speed of the shaft 14 to either the intermediate, slow or the reverse to not only stop and hold the member 37 of the clutch stationary, but also to shift the keys lengthwise of the transmission shaft so as to engage either of the wheels 25, 26, or 27 to lock the same to the transmission shaft.

The highest speed of the transmission shaft 14 may be obtained at any time while the machine is running no matter what the position of the locking keys may be and entirely independent of any movement of said keys. To effect this, the clutch 38 has a member 41 fastened to the transmission shaft 14, and said rigid member has a disk-like friction face, and opposed to said face is a movable friction disk 42 which is slidingly held on the member 41 and is adapted to rotate therewith. A disk 43 is held to the member 37 in any suitable way, and between this member or disk and the opposed faces of members 37 and 41 are arranged fibrous or other friction disks 44, which are adapted to clamp the members 37, 42, and 43 rigidly together when the member 42 is forced inward toward the member 41. The member 41 has a sleeve 45 adjustably held thereon, and on this sleeve are pivoted clutch arms 46, the inner ends of which are cam-shaped and adapted to engage the outer surface of the clamping member 42 of the clutch, and have their other ends arranged in the path of a clutch sleeve 47 which is slidingly held on the transmission shaft 14. As the clutch sleeve 47 is moved, it will engage the outer ends of the clutch arms 46 and will force the member 42 of the clutch into clamping engagement with the member 42, so as to lock said members and the member 37 of the clutch together. This action of the clutch will cause all the parts to rotate together with the fly-wheel or engine shaft if the keys 32 are in position to lock either of the gears 25, 26 or 27 to the shaft 14, and when said parts are so locked together they will rotate at the same speed as the engine shaft. The clutch shown is of a common type, and it is not particularly claimed herein as the same may be of any suitable or desired construction. By the means shown, the highest speed or that corresponding to the speed of the engine shaft may be obtained entirely independent of the movement or the position of the keys 32 so long as the latter are in position to lock either of the gears 25, 26 or 27 to the transmission shaft.

When the clutch 38 is operated to cause the transmission shaft to rotate at the highest speed, it is necessary to release the brake-band 39 from the member 37 of the clutch, in order that all the parts may rotate together. As shown, the clutch sleeve 47 is engaged by the forked end of the lever 48 which is pivoted at 48ª to the end 49 of a bracket 50, said bracket being of any suitable form, and arranged so that it may be bolted or otherwise secured to a part of the vehicle frame. This lever 48 is connected at its upper end to a rod 51 or other operating means, and to the lever 48 is connected a link 52. This link 52 has its other end connected to a cam-bar 53, and this cam-bar is held to slide in the angular portion of the bracket 50. The cam-bar 53 has its cam 54 arranged in the path of movement of the inwardly turned end 55 of a rod 56. This rod 56 is guided in slots in the angular part of the bracket 50, and has its end 55 arranged so that the movement of the cam-bar by the lever 48 will force the rod 56 outward, and this outward movement of the cam-bar will tighten the brake-band 39 around the periphery of the brake or clutch member 37 of the clutch 38, so as to hold said member stationary. A spring 57 is arranged between the outwardly bent ends 58 of the brake-band, and is intended to restore the rod 56 to its inward position when the band is released. The band at one end thereof is held to a yielding arm or bracket 59 which is secured to the bracket 50, and this bracket 59 is adapted to cause the brake-band to move to a position so as not to clamp the member 37 of the clutch. As the arm 48 is moved on its pivot 48ᵃ to throw the clutch into operation to lock the parts together, it will release the band 39 from engagement with the member 37 of the clutch 38, and when the brake-band 39 is applied to the clutch member the clutch will be disengaged, so that it will be impossible for both the clutch and the brake-band to be applied at the same time, though it will be understood that an intermediate position of the lever 48 will cause both brake-band and the clutch to be released.

In Figs. 4 and 5 the construction is somewhat similar to that already described, but the arrangement of the gears and the operating parts are somewhat differently constructed. The engine shaft 60 and the transmission shaft 61 may be arranged in the same relative position as shown in the other figures, and to a part of the fly-wheel 62 may be secured a casing 63 in which is arranged two sets of gears 64. These gears 64 correspond in operation and position to the sets of gears 19 of Fig. 1 and are adapted to rotate in unison upon bushings which are held by the studs 30 within the casing 63. The gears of the sets 64 are arranged with respect to each other slightly different from the gears of the sets 19. As shown, the gear 66 indicates the reverse, 67 the slow, 68 the intermediate, and 69 the driving gears. These gears mesh with gears 70, 71, 72, and 73 respectively, and the gear 73 is fastened to the transmission shaft 61. The gear 72 is held to a sleeve 74 which is secured to the member 37 of the clutch 38, the latter being substantially the same as shown in Fig. 1. The gear 71 is held to a sleeve 75, and this sleeve is secured to a brake-wheel 76, while the gear 70 has a sleeve 77, which is secured to a brake-wheel 78. Each of the brake-wheels 37, 76, and 78 are adapted to have a brake-band 79 applied thereto by any suitable means, and independent of each other, and in case either of said brake-wheels is held stationary, it will hold the gear connected therewith also stationary, and thus cause an independent rotation of the sets of gears 64 on their own axis as they revolve with the fly-wheel, and this rotation will be communicated to the gears 69 and 73, and through the latter to the transmission shaft 61. As in the other construction, the reverse motion of the transmission shaft is obtained by the difference of size between the respective driving gears and the gears operatively connected with the transmission shaft, so that a slight gain in the rotation of the sets of gears 64 of the reversing set will cause the shaft to move in the opposite direction to that in which the engine shaft rotates. The clutch shown is substantially the same as that previously described, and this clutch as well as the brake-band may be operated in any suitable way, and they are so arranged that the clutch will not operate to lock the parts together without first releasing all of the brake-bands.

Fig. 6 shows a construction very similar to that of Fig. 1, and the arrangement of the transmission gears is substantially identical. For the sake of clearness the gears are numbered the same as in Fig. 1, and the main difference in this construction from that of Fig. 1 is that instead of the sliding keys which move into engagement with the gears 25, 26, and 27, these latter gears are secured to each other and to sliding bars 80 which are connected to be moved along the transmission shaft 14 as already described. These bars 80 are held in grooves in the transmission shaft 14, and in said transmission shaft are additional keys 81 along which the gears 25, 26, and 27 are adapted to slide. In causing these gears to move in unison instead of the keys, it is necessary to spread the gears of the sets 19 further apart so that a neutral position may be obtained. In the position shown in Fig. 5 the movement of the transmission shaft will be reverse of that of the engine shaft, and if the gear 26 is in mesh with the gear 22 a slow speed will be obtained, and on further movement so that the gear 25 will mesh with the gear 21 an intermediate speed will be obtained. The construction and arrangement of the clutch 38, and the means by which it is thrown into locking position so that all the parts may rotate together to secure the highest speed, or to release the brake-band from the clutch wheel or member 37 is substantially the same as shown in Figs. 1 and 2. As in Fig. 1 the gear 24 is held to rotate with the brake-member of the clutch, so that when the brake-band is applied to hold said member stationary, the gear 24 will also be held stationary, and said gear will cause the sets of gears 19 to rotate in unison and impart movement to the transmission shaft 14 according to which gear 25, 26 or 27 is in mesh with its corresponding gears of the sets 19.

From the foregoing it will be seen that simple and efficient means is provided whereby the power may be applied to the transmission shaft at a point distant therefrom so that the gears may be of a small diameter, and still obtain a proper purchase or leverage to rotate the same; that simple means is provided to throw the parts into position to obtain either a forward or reverse movement of the transmission shaft; that the highest speed may be obtained immediately without the independent movement of any other part of the mechanism; that the transmission may be applied as a part of the fly-wheel, to serve in part as a balance therefor, and that the transmission shaft may rotate at the same speed as the engine shaft.

Having thus described my invention, I claim as new, and desire to secure by Letters Patent:—

1. In an automobile transmission mechanism, the combination with a fly-wheel, of a plurality of sets of planetary gears of different diameters held to the fly-wheel, a transmission shaft rotatably held in the fly-wheel, a plurality of gears held to rotate with the transmission shaft as an axis and meshing with the planetary gears, means for locking certain of the gears to the transmission shaft, together with means for imparting a rotary movement to the sets of gears on their own axis as they move with the fly-wheel.

2. In an automobile transmission mechanism, the combination with a fly-wheel, of a plurality of planetary gears of different diameters held to the fly-wheel, a transmission shaft rotatably held in the fly-wheel, a plurality of independent gears held to rotate with the transmission shaft as an axis and meshing with the planetary gears, means for locking certain of the gears to the transmission shaft, together with means for imparting a rotary movement to the planetary gears on their own axis as they move with the fly-wheel.

3. In an automobile transmission mechanism, the combination with a fly-wheel, of a plurality of sets of planetary gears of relatively different diameters held to the fly-wheel, a transmission shaft rotatably supported in the fly-wheel, a plurality of gears of different diameters held to rotate with the transmission shaft as an axis and meshing with the planetary gears, movable keys for locking certain of the gears to the transmission shaft, together with means for imparting a rotary movement to the planetary sets of gears on their own axis as they move with the fly-wheel.

4. The combination with a transmission shaft and means for supporting the same, of a plurality of gears held to rotate independently of the transmission shaft with the latter as an axis, a plurality of planetary gears meshing with the gears on the transmission shaft, and means for locking certain of the rotary gears to the transmission shaft, together with means for causing the planetary gears to rotate on their own axis.

5. The combination with a fly-wheel forming a casing, of a shaft adapted to rotate independent of the fly-wheel, a plurality of gears, means for locking said gears to rotate with the shaft, a plurality of planetary gears journaled within the fly-wheel and adapted to impart motion to the first-mentioned gears, and means for rotating the planetary gears on their axis.

6. The combination with a hollow fly-wheel and a shaft for rotating said wheel, of a transmission shaft axially arranged with respect to the fly-wheel shaft, a cap piece secured to the fly-wheel and forming an inclosed casing, a plurality of gears rotatably held on the transmission shaft, means for locking the gears to the shaft, a plurality of planetary gears journaled in the fly-wheel for rotating the gears on the transmission shaft, and means for controlling said planetary gears on their axis.

7. The combination with a transmission shaft, of a plurality of gears rotatably held on said shaft, a movable key for locking the gears to the shaft, a plurality of planetary gears for rotating the gears on the transmission shaft, and means for controlling said planetary gears on their axis.

8. The combination with a transmission shaft, of a plurality of gears rotatably held on said shaft, means for locking the gears to the shaft, a plurality of planetary gears for rotating the gears on the transmission shaft, means for rotating the planetary gears on their own axis, and a clutch whereby all the parts may be made to rotate in unison.

9. The combination with a transmission shaft, of a plurality of gears having said shaft as an axis, a gear held to rotate independently of said shaft, a plurality of planetary gears in mesh with the first-mentioned gears, means coöperating with said independently rotatable gear for causing the planetary gears to rotate on their own axis, together with means for locking the shaft and before mentioned parts together and simultaneously releasing the means for causing a rotary movement of the planetary gears on their own axis.

10. The combination with a fly-wheel, of a transmission shaft, a plurality of gears having said shaft as an axis, a gear adapted to rotate independently of said shaft, a plurality of planetary gears in mesh with the first-mentioned gears, means located on one side of the fly-wheel coöperating with said independently rotatable gear for causing the planetary gears to rotate on their own axis, together with means located adjacent to the planetary gear operating means and on the same side of the fly-wheel for locking the shaft and before mentioned parts together and simultaneously releasing the means for causing a rotary movement of the planetary gears on their own axis.

11. The combination with a transmission shaft, of a plurality of gears of relatively different diameters independently rotatable on said shaft, a device slidingly held on the shaft to move lengthwise thereof and adapted to lock certain of said gears to the transmission shaft, a plurality of planetary gears of relatively different diameters in mesh with the gears having the transmission shaft as an axis, and means for imparting a rotary movement to the planetary gears.

12. The combination with a transmission shaft, of a plurality of gears of relatively different diameters independently rotatable on said shaft, a key slidingly held on the shaft to move lengthwise thereof and adapted to lock certain of said gears to the transmission shaft, a plurality of planetary gears of relatively different diameters in mesh with the gears having the transmission shaft as an axis, and means for locking all of the gears to the transmission shaft.

13. The combination with a transmission shaft, of a plurality of gears of different diameters independently rotatable on said shaft, keys slidingly held on the shaft to move lengthwise thereof and adapted to lock certain of said gears to the transmission shaft, a plurality of sets of planetary gears of different diameters in mesh with the gears having the transmission shaft as an axis, means for imparting a rotary movement to the planetary gears, and means whereby all the gears and the transmission shaft may be locked together and rotate in unison.

14. The combination with a transmission shaft and means for supporting the same, of a set of four gears arranged with the transmission shaft as an axis and having relatively different diameters and arranged to rotate independently of said shaft, keys slidingly held on the shaft and adapted to engage and lock certain of said gears to the shaft, a plurality of planetary gears of relatively different diameters held to rotate in unison and meshing with the gears on the transmission shaft, and means for holding one of the gears on the transmission shaft stationary so as to impart an independent rotary movement to the planetary gears as they move around the transmission shaft.

15. The combination with a transmission shaft and means for supporting the same, of a set of gears arranged with the transmission shaft as an axis and having different diameters and arranged to rotate independently of said shaft, means held on the shaft and adapted to engage and lock certain of said gears to the shaft, a plurality of planetary gears of relatively different diameters held to rotate in unison and meshing with the gears on the transmission shaft, the gears being so proportioned that one of the planetary gears will reverse the direction of rotation of one of the gears on the transmission shaft, and means for holding one of the gears on the transmission shaft stationary so as to impart an independent rotary movement to the planetary gears as they move around the transmission shaft.

16. The combination with a transmission shaft and means for supporting the same, of a set of gears arranged with the transmission shaft as an axis and having different diameters and arranged to rotate independently of said shaft, keys slidingly held on the shaft and adapted to engage and lock certain of said gears to the shaft, a plurality of planetary gears of different diameters held to rotate in unison and meshing with the gears on the transmission shaft, the gears being so proportioned that one of the planetary gears will reverse the direction of rotation of one of the gears on the transmission shaft, means for holding one of the gears on the transmission shaft stationary so as to impart an independent rotary movement to the planetary gears as they move around the transmission shaft, and means coöperating with a portion of said holding means for locking the parts together to cause them to rotate in unison.

17. The combination with a transmission shaft and means for supporting the same, of a plurality of gears independently rotatable on the shaft and having the latter as an axis, means for locking certain of the gears to the shaft, a plurality of planetary gears meshing with the gears on the transmission shaft, clutch mechanism for locking the shaft and all the gears to rotate in unison, and means coöperating with one of said independently rotatable gears for controlling the planetary gears on their axis.

18. The combination with a transmission shaft and means for supporting the same, of a plurality of gears independently rotatable on the shaft and having the latter as an axis, movable keys for locking certain of the gears to the shaft, two sets of planetary gears located on opposite sides of the transmission shaft and meshing with the gears on said transmission shaft, clutch mechanism for locking the shaft and all the gears to rotate in unison, and means coöperating with one of said independently rotatable gears for controlling the planetary gears on their axis.

19. The combination with a transmission shaft, of a plurality of gears of relatively different diameters arranged on the shaft with the latter as an axis and independently rotatable thereon, means for locking certain of the gears to the shaft, a plurality of planetary gears arranged to rotate in unison and having relatively different diameters and meshing with the gears on the transmission shaft, means for giving an independent rotary movement to the planetary gears, a clutch for locking all the parts together, together with mechanism for operating the clutch to lock all the parts together and simultaneously releasing the means for causing an independent rotary movement of the planetary gears.

20. The combination with a transmission shaft, of a plurality of gears of relatively different diameters arranged on the shaft with the latter as an axis and independently rotatable thereon, means for locking certain of the gears to the shaft, a plurality of planetary gears arranged to rotate in unison and having relatively different diameters and meshing with the gears on the transmission shaft, means for holding one of the rotary transmission-shaft gears stationary to give an independent rotary movement to the planetary gears, a clutch for locking all the parts together, together with mechanism for operating the clutch to lock all the parts together and simultaneously releasing the means for causing an independent rotary movement of the planetary gears.

21. The combination with a transmission shaft, of a plurality of gears of relatively different diameters arranged on the shaft with the latter as an axis and independently rotatable thereon, of a plurality of planetary gears arranged to rotate in unison and having relatively different diameters and meshing with the gears on the transmission shaft, keys for locking certain of the rotatable gears to the transmission shaft, means for giving an independent rotary movement to the planetary gears, the gears being so proportioned that the direction of rotation of the shaft may be reversed, a clutch for locking all the parts together, together with mechanism for operating the clutch to lock all the parts together and simultaneously releasing the means for causing an independent rotary movement of the planetary gears.

22. The combination with a fly-wheel having a cap forming a casing, of a transmission shaft held to rotate in the casing, a set of four gears of relatively different diameters arranged to rotate independent of the transmission shaft and having the latter as an axis, certain of said gears having a slot and an annular groove therein, keys slidingly held in the transmission shaft and having projecting ends adapted to enter the slots of the gears to lock the same to the shaft one at a time or to be alined with the grooves to release said gears, two sets of planetary gears each comprising four gears of relatively different diameter in mesh with the gears on the transmission shaft and arranged on opposite sides of said shaft, said gears being held to rotate in unison, studs or shafts on which the planetary gears may rotate, means coöperating with said studs to clamp the parts of the fly-wheel casing together so as to inclose the transmission gears, a clutch member rotatably held on the transmission shaft and secured to one of the gears having the transmission shaft as an axis, a brake-band for holding said member stationary so as to hold the gear secured thereto also stationary and thereby impart independent rotary movement to the planetary set of gears, clutch mechanism for locking the fly-wheel casing, gears, and transmission shaft together so that all may rotate in unison, and means for forcing the clutch into engagement and simultaneously releasing the brake-band.

23. A transmission mechanism comprising a shaft, a set of four gears of relatively different diameters arranged to rotate independent of the transmission shaft and having the latter as an axis, certain of said gears having a slot and an annular groove therein, keys slidingly held in the transmission shaft and having projecting ends adapted to enter the slots of the gears to lock the same to the shaft one at a time or to be alined with the grooves to release said gears, two sets of planetary gears each comprising four gears of relatively different diameters in mesh with the gears on the transmission shaft and arranged on opposite sides of said shaft, said gears being held to rotate in unison, a clutch member rotatably held on the transmission shaft and secured to one of the gears having the transmission shaft as an axis, a brake-band for holding said member stationary so as to hold the gear secured thereto also stationary and thereby impart independent rotary movement to the planetary sets of gears, clutch mechanism for locking the gears and transmission shaft together so that all may rotate in unison, and means for forcing the clutch into engagement and simultaneously releasing the brake-band.

24. A transmission mechanism comprising a casing, a shaft held to rotate in the casing, a set of four gears of relatively different diameters arranged to rotate independent of the transmission shaft and having the latter as an axis, keys slidingly held in the transmission shaft and having projecting ends adapted to lock the gears to the shaft one at a time or to release said gears, two sets of planetary gears each comprising four gears of relatively different diameters in mesh with the gears on the transmission shaft and arranged on opposite sides of said shaft, said gears being so proportioned that the shaft may be reversed without reversing the direction of movement of the planetary gears, a clutch member rotatably held on the transmission shaft and secured to one of the gears having the transmission shaft as an axis, means for holding said member stationary so as to hold the gear secured thereto also stationary and thereby impart independent rotary movement to the planetary sets of gears, clutch mechanism for locking the gears and transmission shaft together so that all may rotate in unison, and means for forcing the clutch into engagement and simultaneously releasing the clutch member to release the stationary gear.

25. A transmission mechanism comprising a shaft, a set of gears of different diameters arranged to rotate independent of the transmission shaft and having the latter as an axis, certain of said gears having a slot and an annular groove therein, keys slidingly held in the transmission shaft and having projecting ends adapted to enter the slots of the gears to lock the same to the shaft one at a time or to be alined with the grooves to release said gears, planetary gears of different diameters in mesh with the gears on the transmission shaft, and means coöperating with one of said independently rotatable gears for controlling the planetary gears on their axis.

26. A transmission mechanism comprising a shaft, a set of four gears of different diameters arranged to rotate independent of the transmission shaft and having the latter as an axis, certain of said gears having a slot and an annular groove therein, means slidingly held to the transmission shaft and adapted to enter the slots of the gears to lock the same to the shaft one at a time or to be alined with the grooves to release said gears, two sets of planetary gears of different diameters in mesh with the gears on the transmission shaft and arranged on opposite sides of said shaft, and means coöperating with one of said independently rotatable gears for controlling the planetary gears on their axis.

27. The combination with a fly-wheel having a cap forming an inclosed casing, of a transmission shaft held to rotate in the casing, a set of four gears of different diameters arranged to rotate independent of the transmission shaft and having the latter as an axis, certain of said gears having a slot and an annular groove therein, keys slidingly held in the transmision shaft and having projecting ends adapted to enter the slots of the gears to lock the same to the shaft one at a time or to be alined with the grooves to release said gears, two sets of planetary gears each comprising four gears of different diameters in mesh with the gears on the transmission shaft and arranged on opposite sides of said shaft, and means coöperating with one of said independently rotatable gears for controlling the planetary gears on their axis.

28. The combination with a fly-wheel having a cap forming an inclosed casing, of a transmission shaft held to rotate in the casing, a set of four gears of relatively different diameters arranged to rotate independent of the transmission shaft and having the latter as an axis, certain of said gears having a slot and an annular groove therein, keys slidingly held in the transmission shaft and having projecting ends adapted to enter the slots of the gears to lock the same to the shaft one at a time or to be alined with the grooves to release said gears, two sets of planetary gears each comprising four gears of relatively different diameters in mesh with the gears on the transmission shaft and arranged on opposite sides of said shaft, said gears being held to rotate in unison and arranged within the casing, a brake member rotatably held on the transmission shaft and held to one of the gears having the transmission shaft as an axis, means for holding said member stationary so as to hold the gear secured thereto also stationary and thereby impart independent movement to the planetary sets of gears, and clutch mechanism for locking the fly-wheel casing, gears and transmission shaft together so that all may rotate in unison.

29. The combination with a transmission shaft, of transmission gears of relatively different diameters adapted to impart different speeds to said shaft, a clutch for locking the transmission gears and shaft together so as to rotate in unison, a brake-band adapted to engage one member of said clutch to hold the member stationary and thereby impart movement to certain of the transmission gears, an outward-projecting rod engaging the band, a cam bar movable adjacent to the rod and adapted to engage its end to force the latter outward, a lever operatively connected with the clutch at one end, means for supporting the lever, and means for connecting the lever to the cam bar whereby the movement of said lever will disengage the clutch and simultaneously cause the brake-band to be applied or vice versa whereby different speeds of the transmission shaft may be obtained.

30. The combination with a transmission shaft, of transmission gears of different diameters adapted to impart different speeds to said shaft and to reverse the direction of rotation of the shaft without changing the direction of rotation of the driving gears, a brake member, a brake-band adapted to engage said member to hold the latter stationary and thereby impart movement to certain of the transmission gears, an outward projecting rod engaging the band so as to cause the latter to hold the brake member stationary, a cam bar movable adjacent to the rod and adapted to engage its end to force the latter outward, and a lever operatively connected at one end to the cam bar.

31. The combination with a transmission shaft, and transmission gears of relatively different diameters adapted to impart different speeds to said shaft, of a clutch for locking the transmission gears and shaft together so as to rotate in unison, means for holding one member of said clutch stationary and thereby impart movement to certain of the transmission gears, a rod, a cam bar movable adjacent to the rod and adapted to engage its end to force the latter outward, a lever operatively connected with the clutch at one end, means for supporting the lever, and a link for connecting the lever to the cam bar whereby the movement of said lever will disengage the clutch and simultaneously cause said clutch member to be held stationary or vice versa whereby different speeds of the transmission shaft may be obtained.

32. The combination with a fly-wheel forming a casing, of transmission gears of relatively different diameters arranged in said casing, a transmission shaft adapted to be operatively connected with the gears to rotate with said gears or the latter to rotate independent of said shaft, and means for rotating the shaft and gear in unison.

33. The combination with a transmission shaft, of transmission gears adapted to impart movement to said shaft, a clutch having one member thereof forming a part of a brake, means for connecting the member to the transmission gears, a brake-band adapted to engage the periphery of the brake member, a bracket, a yielding bar connecting the bracket to one end of the brake-band, a rod connected to the brake-band, a cam bar movable in the bracket and adapted to move the rod so as to cause the brake-band to clamp the brake member and hold the latter stationary, a pivoted lever operatively connected with the clutch at one end, a link connected to the cam bar and to the lever so that when the lever is moved on its pivot it will release the clutch or clamp the band and vice versa, and means for operating the lever.

34. The combination with a transmission shaft, of transmission gears adapted to impart movement to said shaft, a clutch having one member thereof forming a part of a brake, means for connecting the member to the transmission gears, a brake-band adapted to engage the periphery of the brake member, a bracket, a rod connected to the brake-band, a cam bar movable in the bracket and adapted to move the rod so as to cause the brake-band to clamp the brake member and hold the latter stationary, a pivoted lever operatively connected with the clutch at one end, and a link connected to the cam bar and to the lever so that when the lever is moved on its pivot it will release the clutch or clamp the band and vice versa.

35. In an automobile transmission mechanism, the combination with a fly-wheel, of a plurality of planetary gears held to the fly-wheel, a transmission shaft rotatably held in the fly-wheel, a plurality of gears arranged on the transmission shaft and operated by the planetary gears, and means for locking certain of the gears to the transmission shaft.

36. In an automobile transmission mechanism, the combination with a fly-wheel, of a plurality of sets of planetary gears of different diameters held to the fly-wheel, a rotatable transmission shaft, a plurality of gears of different diameters arranged on the transmission shaft and directly in mesh with the planetary gears, and means for locking the gears to the transmission shaft.

37. The combination with a transmission shaft, of a plurality of gears rotatably held on said shaft, means for locking the gears to the shaft, and a plurality of planetary gears for rotating the gears on the transmission shaft.

38. The combination with a transmission shaft, of a plurality of gears rotatable with said shaft, means for locking the gears to the shaft, and a plurality of planetary gears in mesh with the gears on the transmission shaft.

39. In an automobile transmission mechanism, the combination with a transmission shaft, of a plurality of gears arranged to rotate with the transmission shaft and having the latter as an axis, said plurality of gears comprising two gears which normally rotate in the same direction as the transmission shaft, a driving gear adapted to be held stationary or to rotate with the shaft, and a gear normally rotating in a direction reverse to the direction of rotation of the transmission shaft, and a plurality of planetary gears meshing with the before mentioned gears and serving as a means to rotate the latter.

40. In an automobile transmission mechanism, the combination with a transmission shaft, of a plurality of gears of different diameters arranged to rotate with the transmission shaft and having the latter as an axis, said plurality of gears comprising two gears which normally rotate in the same direction as the transmission shaft, a driving gear adapted to be held stationary or to rotate with the shaft, and a gear normally rotating in a direction reverse to the direction of rotation of the transmission shaft, and a plurality of sets of planetary gears of different diameters meshing with the before mentioned gears and serving as a means to rotate the latter.

This specification signed and witnessed this 19th day of March, A. D. 1907.

JULIUS HENRY RICHARDS.

Witnesses:
JAMES B. CAUTHERS,
L. H. LUNDIN.